United States Patent Office 3,196,664
Patented July 27, 1965

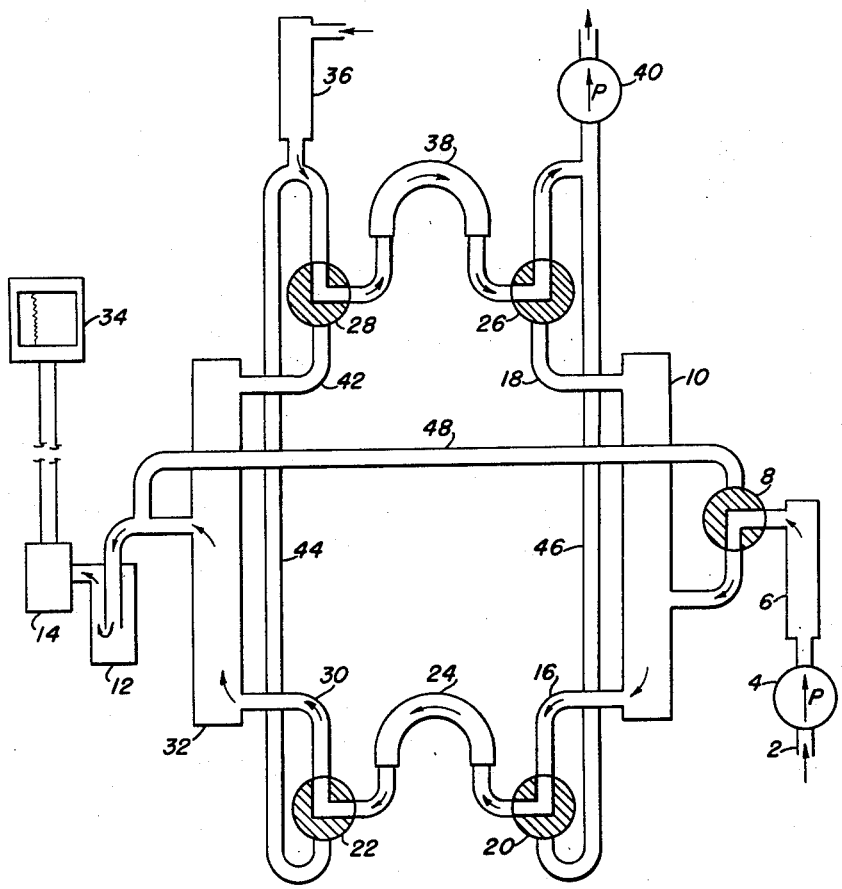

3,196,664
PROCESS OF EMPLOYING FRONTAL ANALYSIS CHROMATOGRAPHY IN WELL LOGGING
Edwin E. Teal, Houston, Tex., assignor to National Lead Company, New York, N.Y., a corporation of New Jersey
Filed July 15, 1959, Ser. No. 827,406
6 Claims. (Cl. 73—23.1)

This invention relates to an improvement in the logging of oil and gas wells, wherein drilling fluids as used in the rotary method of drilling are subjected to essentially continuous analysis to determine the presence and composition of entrained gases. More particularly it relates to a process and apparatus for analyzing the entrained gases that are separated from a drilling fluid.

In the rotary method of drilling for oil and gas, a drilling fluid or mud is circulated down through the drill stem and out through openings in the bit where it picks up cuttings which are carried to the surface as the mud rises in the space between the drill pipe and the hole. During the short interval of time the mud is near the bottom of the hole, it also entrains any gaseous or liquid hydrocarbons as well as other gaseous or liquid products that may be liberated from the formation adjacent to the well bore. When the drilling fluid returns to the surface, it is customary to subject a portion of it to various treatments such as agitation, vacuum, etc. in order to liberate any entrained gases which may have been picked up during its circulation through the well. The liberated gases are then subjected to various methods of analysis in order to determine their composition and thus serve as an indication of potentially productive formations recently penetrated by the bit or immediately ahead of the bit.

When conventional water-base fluids are used in drilling wells, the detection and analysis of entrained gases does not normally present a particularly difficult problem. They can, for example, be analyzed by causing a portion of the gas stream to pass over a hot wire gas detector filament. The operation of a hot-wire gas detector as adapted to well logging operations is described in considerable detail in an article entitled "Some Recent Developments in Mud-Analysis Logging" by B. Otto Pixler, AIME Transactions, Petroleum Division, volume 165, page 268.

When water-base fluids are used in drilling, any hydrocarbons detected in the gas extracted from the drilling fluid will normally be indicative of conditions in the well, particularly the formations recently penetrated by the bit. However, many drilling operations cannot be successfully conducted with conventional water-base fluids; in such instances it is frequently desirable to drill with oil base or oil emulsion fluids.

Emulsion drilling fluids are prepared by emulsifying oil with water at the time the drilling fluid is originally prepared or by incorporating a substantial percentage of oil into a water-base fluid that has previously been in use in the well. Although the use of emulsion drilling fluids helps solve many drilling problems, it complicates mud analysis logging in that it makes accurate analysis of the gases extracted from the mud quite difficult. This is true because the volatile hydrocarbon vapors that are present in the mud from the added oil give such a high background of hydrocarbons in the $C_2$ and heavier range that it is difficult to detect the gases that may have been picked up by the mud during its circulation to the bottom of the hole. In addition, oil from other extraneous sources may frequently enter the drilling mud and result in false gas shows, as for example, where on upper oil-bearing formation has been drilled and has not yet been cased off or where oil has been used in an effort to free stuck drill pipe.

The presence of large amounts of extraneous oil in a drilling fluid has in the past frequently presented an almost insurmountable difficulty in conducting any worthwhile determination of gas in the mud. Since it is unlikely that any significant amount of methane will be introduced into the drilling fluid through the incorporation of oil from the extraneous sources such as discussed above, it would appear logical that a determination of methane in the drilling fluid would give a reliable indication of significant hydrocarbon containing zones penetrated by the bit. Unfortunately, small percentages of methane cannot be accurately determined in the presence of a high concentration of heavy hydrocarbons, commonly referred to as wet gas. Various methods have been proposed and investigated for continuously removing the wet gases from an air-gas mixture containing methane. However, none of these previous methods have been satisfactory when very high concentrations of wet gases are present.

It is, therefore, an object of this invention to provide an improved process for logging wells by the mud analysis method wherein a high concentration of wet gas is encountered.

It is another object of this invention to provide a method of continuously removing high concentrations of wet gas from air-gas mixtures prior to making a direct determination of methane in the mixture.

Another object of this invention is to provide a method whereby gaseous hydrocarbon logging can be carried out completely automatically, even in the presence of a high concentration of wet gas.

Another object of this invention is to enable methane shows in a drilling fluid to be detected in the presence of a normally overwhelming quantity of heavier hydrocarbons.

Another object of this invention is to provide a method for directly determining the presence and proportions of hydrocarbons of the paraffin series present in an air-gas mixture.

Still another object of this invention is to provide a means of successfully carrying out mud analysis logging in the presence of oil emulsion drilling fluids.

These and other objects will become apparent from the following description of the present invention.

Referring to the drawing, the figure shows a diagrammatic view of the essential parts of the apparatus for carrying out the inventive process.

Generally stated and in accordance with an illustrative embodiment of this invention, a drilling fluid after emerging from the drill hole is subject to vigorous agitation or other action to extract the gas therefrom, which is generally admixed with air. The air-gas mixture is then passed through the first member of a series of chromatographic columns, the air-gas mixture being permitted to flow through this first column for a predetermined length of time before shifting the flow to another column, the flow through each column being maintained for a length of time sufficient to permit methane or other gaseous components that are of interest in the air-gas mixture to pass through the column. The effluent gas mixture which emerges from the column is then analyzed to determine the presence and proportion of those gases that are of interest. After the flow of feed gas is shifted to a second column, the first column is back flushed with a sufficient quantity of air to remove essentially all of the adsorbed gases. This back flow operation is accomplished for each column during the period the feed gas is flowing through one of the other columns, so that each column will be fully reactivated and have a high adsorptive capacity when the feed gas is again passed through. Chromatographic techniques have recently been rather widely adapted to assist in the analysis of well logging gases. Basically, chromatography takes advantages of the different adsorption or partitioning characteristics of the components making up a fluid mixture when the fluid is brought in contact with an adsorbing or partitioning medium. In gas-liquid partitioning chromatography, a non-volatile liquid is coated on the surface of a granular non-porous material. The components of a gas mixture that are to be separated must have appreciable solubility in the non-volatile coating liquid. As the gas mixture passes through the chromatographic medium with the aid of a carrier gas, the various components in the gas mixture will partition themselves between the stationary liquid phase and the moving gas phase at different rates, and thus make possible a separation of the gas mixture into its various components. In gas adsorption chromatography, a gas mixture is brought into contact with an adsorption medium. The various components of the gas mixture will possess different adsorption characteristics, some tending to be easily adsorbed by the stationary adsorbing medium and others, being less easily adsorbed, will be carried further or in some cases completely through the adsorbing medium by the carrier gas. In adapting chromatography to well logging operations in accordance with the inventive process herein described, it has been found advantageous to use a chromatographic medium that will make it possible to take advantage of both adsorption and partition chromatography. It is understood that with the utilization of partition materials in the columns with the present invention, the usual carrier gas elution technique is not followed and separation of the components from the columns is effected solely by the passage of the continuous flow of air-gas mixture admitted to the instrument. Thus, in the analyzer there is no interruption in the continuous flow of the air-gas mixture from the drilling fluid except that due to the switching of the flow to the different columns. The method of operating the apparatus will be recognized by those skilled in the art as coming within the term of "frontal analysis." Such frontal analysis may be made quantitative even when several components are present. Details for this have been given by S. Claeson in a series of papers (in English) in Arkiv for Kemi, Mineralogi och Geologi, vol. 20A, No. 3 (14 pp.) (1945; vol. 23A, No. 1 (133 pp.) (1946); and vol. 24A, No. 7 (7 pp.) (1946).

The process of logging wells in accordance with this invention can readily be understood by referring to the attached drawing, which is a flow diagram showing two chromatographic columns through which an air-gas mixture can be directed. It will, of course, be apparent that more than two chromatographic columns may be used, if desired, in the practice of the inventive process. The air-gas mixture which has been extracted from a drilling fluid is introduced into the system through conduit 2 where it passes to a compressor 4 which compresses the air-gas mixture to a pressure of a few pounds per square inch. It then passes through flow meter 6 where the gas flow is adjusted to a predetermined value before going to a by-pass valve 8. By-pass valve 8 has one channel which permits passage of the gas mixture to manifold 10 which is connected with the arrangement of chromatographic columns; the other channel of by-pass valve 8 permits the gas mixture to pass directly to the hydrogen reactor 12 and hot wire detector filament 14. When by-pass valve 8 is set to permit the air-gas mixture which is to be analyzed to enter manifold 10, the gas flow can be through either conduit 16 or 18. If valves 20 and 22 are open, the flow will be through chromatographic column 24. (Valves 20, 22, 26, and 28 can conveniently be either solenoid valves or solenoid operated mechanical valves.) The effluent gas passing through column 24 goes through valve 22 and conduit 30 to manifold 32 which serves to direct the gas from the columns along a common effluent path and then through hydrogen reactor 12, which is a palladium catalyst bed maintained at sufficiently high temperature to combust hydrogen but not high enough to combust saturated hydrocarbons. From the hydrogen reactor the gas flows to the hot wire detector filament 14, which is operated at a sufficiently high temperature to cause combustion of any methane present in the air-gas mixture reaching the filament. Periodically the filament temperature can be reduced to a temperature which will just permit combustion of wet gases to give a safety check on the performance of the chromatographic columns. The hot wire detector is electrically connected to a suitable recorder 34, which is set to print a curve in response to signals received from the hot wire detector. A multiple point recorder such as the Brown Electronik is a very satisfactory recorder if methane is the only component of the air-gas mixture that is to be determined. When other constituents of the air-gas mixture in addition to methane are of interest, a drag pen recorder has been found to be particularly valuable. During that portion of the cycle in which the gas flow is through column 24, valves 26 and 28 are positioned so as to permit the flow of back-flushing air through flow meter 36, column 38, and vacuum pump 40. Valves 20, 22, 26, and 28 are all electrically controlled by the continuous recorder 34. When the methane content of the air-gas mixture is to be determined, flow through each column is maintained approximately 30 to 60 seconds before it is changed to the other column; longer intervals of flow through each column are required for detection of other components of the air-gas mixture. The gas flow through each column is adjusted so that maximum methane readings are obtained within the 30–60 second interval. When the setting of valves 20 and 22 is changed to prevent the feed gas from passing through column 24, the setting of valves 26 and 28 are simultaneously changed to permit the air-gas mixture in manifold 10 to pass through column 38. The effluent gas passing through column 38 goes through valve 28 and conduit 42 to manifold 32, where is passes to hydrogen reactor 12 and then to the hot wire detector 14, where any methane content is determined as previously explained. During the portion of the cycle when the feed gas is flowing through column 38, valves 20 and 22 are positioned so as to permit the flow of a sufficient quantity of back-flushing air through flow meter 36, column 24, and vacuum pump 40 to restore column 24 to its full partitioning and adsorptive capacity for the next cycle of the process when the feed gas will again be flowing through it.

The chromatographic columns that are used in carrying out a well logging process in accordance with this invention can conveniently be made from a piece of half inch copper tubing approximately six inches long; this tubing can be used as a straight section or preferably formed into a U-shape. The column is packed with any material which has a high adsorptive capacity for water vapor and gaseous hydrocarbons in the $C_2$ and heavier range. It has been found that activated charcoal impregnated with 5% hexadecane or squalane oil is a very suitable material for packing the columns. However, finely divided activated charcoal or other finely divided porous materials may be used without being impregnated with another material.

In the past when a chromatographic column or bed has been used in well logging operations to remove various components from an air-gas mixture, the adsorbing and/or partitioning medium has become quickly saturated with wet gases and, therefore, ineffective. This has necessitated frequent replacement or repacking of the column. In some instances where very high concentrations of wet gas have been encountered, it has been found necessary to change the column after having been in use only a few seconds. By systematically back flushing the columns with a comparatively large volume of air in accordance with the present invention, the adsorbing medium can remain effective over a period of many days or weeks in spite of continuous use in the presence of heavy concentrations of wet gas.

In general it has been found that with an apparatus such as has been described, the flow of the air-gas feed mixture should be controlled by the flow meter to between 1.0 and 1.6 cubic feet per hour. The rate at which back-flushing air is passed through the column should be in the order of eight to ten times the rate the feed gas is passed through the column in order to assure complete reactivation of the column by the time the next cycle of the process is reached.

In the schematic diagram presented in the drawing, the flow of gas is shown being controlled by a series of several valves. It will be apparent to those skilled in well logging operations that a single automatically controlled valve having multiple flow channels can be used to direct the gas streams alternately through two or more chromatographic columns.

The preceding discussion has explained the inventive process in terms of two or more columns, all packed with a material that is capable of separating the components of a gas mixture by adsorption and/or partition chromatography. It may, in some instances, be found desirable to pack one column with an inert filler which will serve to effectively slow down the flow rate of the gas to the same degree as when it is passed through the column packed with active material. This arrangement will give an indication of the methane content of the feed gas during the interval in which the gas flow is through the column packed with the active material, and an indication of the total gas during the interval it flows through the column packed with the inert filler. An indication of total hydrocarbon content as well as methane present in the feed gas is thus obtained during each complete cycle of operation. By referring to the drawing, it can be seen that an indication of total hydrocarbon content of the feed gas can also be obtained when all columns are packed with an active material by changing the setting on by-pass valve 8 to permit the feed gas to pass directly to the hydrogen reactor and the hot-wire detector through conduit 48. However, since the flow rate of the gas passing over the filament will be greater than when the gas passes through the columns, there will be some inaccuracy in the determination due to excess cooling of the catalytic wire.

While the inventive process has been discussed primarily in connection with the determination of methane in an air-gas mixture, it is to be understood that the process is not limited to the determination of methane but may also be adapted to the determination of other gaseous components in an air-gas mixture. When the determination of gaseous components other than methane is of interest, it will be necessary to permit the feed gas to flow through each column for a somewhat longer period of time. In addition, it may, in some cases, be advantageous to change the type and particle size of the packing material in the chromatographic columns. It will be apparent to those skilled in the art of well logging by the mud analysis method that the present invention provides for the first time a means for maintaining a continuous flow of feed gas subject to containing high concentrations of wet gas to the detector unit without the necessity of employing small sample loops, thus permitting much larger proportions of gas to be evaluated and giving greater accuracy in the determinations.

I claim:

1. The process of detecting methane in an air-gas mixture subject to containing hydrogen, methane, higher hydrocarbons, and water vapor, which comprises the steps of causing the air-gas mixture to flow through one after another of the columns in a set of like chromatographic columns to a common effluent path, the flow of said air-gas mixture being repetitively shifted at predetermined time intervals from one column to another column of said set; continuing said flow and said repetitive shifting during said detecting process; during the course of said flow analyzing the effluent gas mixture which flows along said path to determine its methane content; and back flushing each column with a sufficient volume of air to completely purge said column of all adsorbed gases during the time the feed gas is flowing through other columns of the set.

2. The process of claim 1 in which said effluent gas mixture is passed through a hydrogen reactor to remove hydrogen therefrom prior to said determination of its methane content.

3. In the art of logging wells by the mud analysis method wherein entrained gases are extracted from a drilling fluid and mixed with air prior to analysis, the process of detecting the hydrocarbon components in the extracted gases, which comprises the steps of directing the flow of the air-gas mixture through a first member of a set of like chromatographic columns having a common effluent path, said gas flow being maintained through said first column for a predetermined interval of time before shifting the gas flow to a second column; maintaining the flow of the air-gas mixture through said second and each of the subsequent columns and eventually back to the said first column for a like predetermined interval of time; continuing said flow and said repetitive shifting in said manner during said detecting process; during the course of said flow analyzing the effluent gas mixture which flows along said common effluent path to determine its hydrocarbon content; and back flushing each column with a sufficient volume of air to remove essentially all of the adsorbed gases therefrom during the time the feed gas is flowing through other columns of the set.

4. The process of analyzing an air-gas mixture subject to containing hydrogen, methane, higher hydrocarbons, and water vapor, which comprises the steps of causing the air-gas mixture to flow through one after another of the columns in a set of like chromatographic columns to a common effluent path, the flow of said air-gas mixture being repetitively shifted at predetermined time intervals from one column to another column of said set, maintaining said flow and said repetitive shifting during said analyzing process; during the course of said flow analyzing the effluent gas mixture which flows along said path to determine its hydrocarbon content; and back-flushing each column with a sufficient volume of air to completely purge said column of all adsorbed gas during the time the feed gas is flowing through other columns of the set.

5. The process of claim 4 in which said effluent gas mixture is passed through a hydrogen reactor to remove hydrogen therefrom prior to said determination of its hydrocarbon content.

6. The process of analyzing an air-gas mixture subject to containing hydrogen, methane, higher hydrocarbons, and water vapor, which comprises the steps of causing the air-gas mixture to flow through one after another of the columns in a set of like chromatographic columns to a common effluent path, the flow of said air mixture being repetitively shifted at predetermined time intervals from one column to another column of said set; maintaining said flow and said repetitive shifting during said analyzing process; during the course of said flow analyzing the effluent gas mixture which flows along said path to determine its constituents; and back-flushing each column with a sufficient volume of air to completely purge said column of all adsorbed gas during the time feed gas is flowing through other columns of the set.

References Cited by the Examiner

UNITED STATES PATENTS 2,868,011   1/59   Coggeshall _____ 73—23
2,972,246   2/61   Reinecke et al. _____ 73—23

(Other references on following page)